US009860015B2

(12) United States Patent
Charland

(10) Patent No.: US 9,860,015 B2
(45) Date of Patent: Jan. 2, 2018

(54) ELECTRONIC COUNTERMEASURES TRANSPONDER SYSTEM

(71) Applicant: Sky Industries Inc., Ottawa (CA)

(72) Inventor: Shawn Charland, Ottawa (CA)

(*) Notice: Subject to any disclaimer, the term of this patent is extended or adjusted under 35 U.S.C. 154(b) by 260 days.

(21) Appl. No.: 14/695,618

(22) Filed: Apr. 24, 2015

(65) Prior Publication Data
US 2015/0229434 A1  Aug. 13, 2015

Related U.S. Application Data

(63) Continuation of application No. PCT/CA2013/050823, filed on Oct. 31, 2013.
(Continued)

(51) Int. Cl.
*G01S 7/38* (2006.01)
*H04K 3/00* (2006.01)
(Continued)

(52) U.S. Cl.
CPC ............... *H04K 3/65* (2013.01); *F41H 11/02* (2013.01); *G01S 7/38* (2013.01); *G01S 13/74* (2013.01); *H04K 3/40* (2013.01); *H04K 3/45* (2013.01); *H04K 3/42* (2013.01); *H04K 3/44* (2013.01); *H04K 3/92* (2013.01); *H04K 3/94* (2013.01); *H04K 2203/20* (2013.01); *H04K 2203/22* (2013.01); *H04K 2203/24* (2013.01);
(Continued)

(58) Field of Classification Search
CPC . F41H 11/02; G01S 13/74; G01S 7/38; H04K 2203/20; H04K 2203/22; H04K 2203/24; H04K 2203/32; H04K 2203/34; H04K 2203/36; H04K 3/40; H04K 3/42; H04K 3/44; H04K 3/45; H04K 3/65; H04K 3/92
USPC .......................................................... 342/14
See application file for complete search history.

(56) References Cited

U.S. PATENT DOCUMENTS 3,905,035 A  9/1975  Krumboltz
4,827,395 A  5/1989  Anders
(Continued)

FOREIGN PATENT DOCUMENTS

EP  1224488 A1  7/2002

OTHER PUBLICATIONS

PCT/CA2013/050823 International Search Report dated Jan. 24, 2014 and Preliminary Report on Patentability dated May 5, 2015.
(Continued)

*Primary Examiner* — Timothy A Brainard
(74) *Attorney, Agent, or Firm* — Woodard Emhardt Moriarty McNett & Henry LLP

(57) ABSTRACT

A system is provided that has an ECM (electronic counter measures) system and a transponder monitor connected to or forming part of the ECM system. The system monitors for a transponder signal from a remote transponder. The system determines information, such as transponder location, based on the transponder signal and makes use of the information in the ECM system and/or the system extracts encoded information contained in the transponder signal, such as information about a transponder owner, such as status of consumables, medical status. The ECM system may have a reactive jammer that is used both for a reactive jamming function, and as the transponder monitor function.

35 Claims, 7 Drawing Sheets

Related U.S. Application Data

(60) Provisional application No. 61/720,690, filed on Oct. 31, 2012.

(51) Int. Cl.
*G01S 13/74* (2006.01)
*F41H 11/02* (2006.01)

(52) U.S. Cl.
CPC ..... *H04K 2203/32* (2013.01); *H04K 2203/34* (2013.01); *H04K 2203/36* (2013.01)

(56) References Cited

U.S. PATENT DOCUMENTS

| | | | |
|---|---|---|---|
| 6,219,613 B1 | 4/2001 | Terrier | |
| 6,545,632 B1* | 4/2003 | Lyons | G01S 7/021 342/13 |
| 8,184,036 B2 | 5/2012 | Charland | |
| 2006/0262006 A1* | 11/2006 | Vavik | G01S 13/767 342/51 |
| 2007/0136099 A1* | 6/2007 | Neligh | A61B 5/0002 705/3 |
| 2008/0198060 A1* | 8/2008 | Shani | G01S 7/021 342/14 |
| 2009/0189785 A1 | 7/2009 | Kravitz | |
| 2012/0309288 A1 | 12/2012 | Lu | |

OTHER PUBLICATIONS

European Search Report from EP13850819 dated Jun. 17, 2016.
Kasper, T.; Oswald, D.; Paar, C., "Wireless security threats: Eavesdropping and detecting of active RFIDs and remote controls in the wild", Software, Telecommunications and Computer Networks (SoftCOM), 2011 19th International Conference on, pp. 1-6, Sep. 17, 2011.

\* cited by examiner

ELECTRONIC COUNTERMEASURES TRANSPONDER SYSTEM

CROSS-REFERENCE TO RELATED APPLICATIONS

This application also claims the benefit of, and is a continuation of PCT Application Ser. No. PCT/CA2013/050823, filed on Oct. 31, 2013, which in turn claims the benefit of U.S. Provisional Patent Application Ser. No. 61/720,690 filed on Oct. 31, 2012. The entire contents of these related patent applications are incorporated in their entirety herein by reference.

FIELD OF THE PRESENT INVENTION

The present invention pertains to the field of radio frequency signalling and telecommunications, with electronic countermeasures as a specific example.

BACKGROUND OF THE PRESENT INVENTION

This patent application is related in part to patents concerning estimation of the effective range of a communications system, including U.S. Pat. No. 8,184,036 B2, Canada patent 2,624,233, Australia patent 2008201111, and United Kingdom patent GB2449151, the contents of which are hereby incorporated by reference in their entireties.

There are certain communications devices whose normal operating mode involves passively monitoring the electromagnetic signal environment and classifying the various signals it detects. When certain signals are detected, the system may respond by any or all of following actions: 1) radiate a signal, 2) alert an operator or secondary system, and 3) recording the detected signal of interest.

An example of such a communications system is a so-called electronic countermeasures (ECM) system, also known as a jammer. ECM is a subset of electronic warfare (EW) in which signals are radiated with the intention to render a hostile weapon system ineffective; examples include ECM systems to counter missile systems, communications systems, surveillance and targeting radars, and radio controlled improvised explosive devices (RCIEDs). In many cases, the ECM system is intended to provide protection not just for the host platform, but for accompanying protectees such as other platforms, vehicles, equipment or people. In most cases, the effectiveness of the ECM is limited to a volume of space, and protectees must remain inside this space to benefit from the protection provided by the ECM. In the more general case of a communication system, agents that wish to benefit from the capabilities of the communication system must remain within its effective volume.

SUMMARY OF THE INVENTION

According to one aspect of the present invention, there is provided a system comprising: an ECM (electronic countermeasures) system; a transponder monitor connected to or forming part of the ECM system; wherein the system is configured to: monitoring for a transponder signal from a remote transponder; and at least one of: i) determining information based on the transponder signal and making use of the information in the ECM system; and ii) extracting encoded information contained in the transponder signal.

While the detailed embodiments described below assume the use of an ECM system, more generally, any of the embodiments described can be used in the context of a generalized primary communications system. An ECM system can be considered a specific example of such a primary communications system.

According to another aspect of the present invention, there is provided a method comprising: monitoring, with a primary communications system, an electromagnetic signal environment for a transponder signal that includes encoded information from a transponder physically remote from the primary communications system; and responsive to receiving a transponder signal that includes encoded information from a transponder, recovering the encoded information from the transponder signal.

BRIEF DESCRIPTION OF THE DRAWINGS

Embodiments of the invention will now be described in greater detail with reference to the accompanying diagrams, in which.

DETAILED DESCRIPTION

Figure 1:
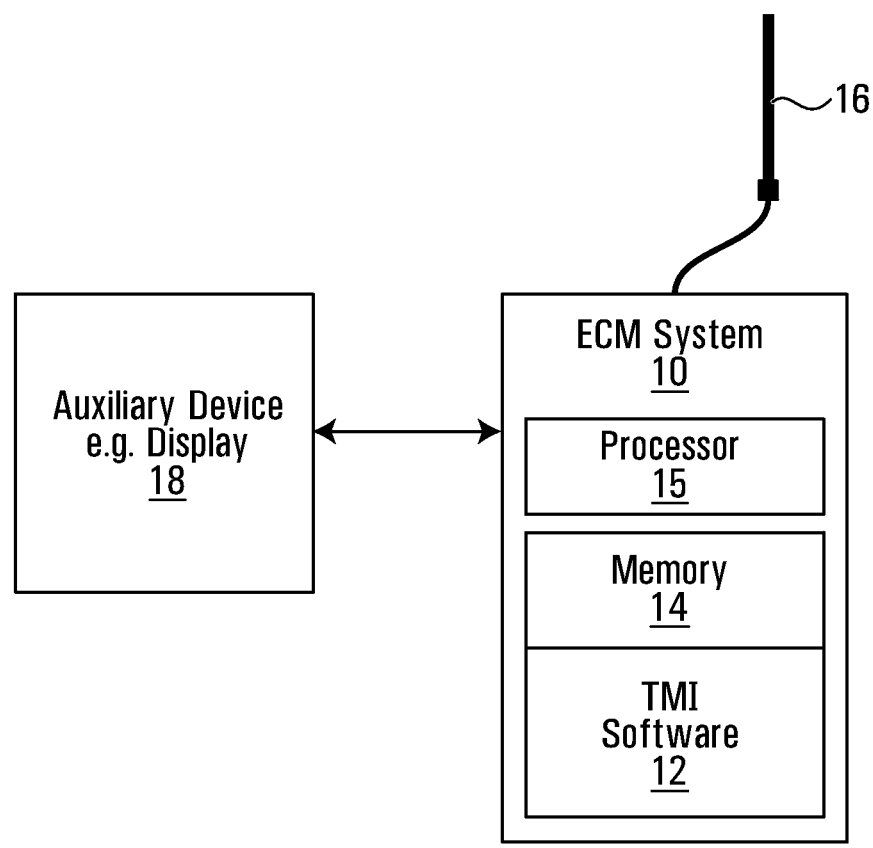
FIG. 1 is a system block diagram illustrating an embodiment of the transponder monitor and/or interrogator/ECM system in which the transponder monitor and/or interrogator comprises a software application running on the ECM system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Some embodiments provide for the ability to track one or more of the following attributes of a potential protectee of an ECM system:

1) the protectee's identity;
2) the distance from a source of the ECM radiation, i.e. the ECM transmit antenna, to the protectee;
3) information about the status of the protectee, for example medical condition, the level of remaining consumables such as water and ammunition; and
4) information about the situation of the protectee, for example whether the protectee is in a life-threatening situation, or is mitigating a life-threatening situation for someone else.

Some embodiments provide the ability to create consolidated information about any one of these things.

Some embodiments provide a system featuring a combination of ECM system and a transponder monitor and/or interrogator for the interrogation of remote transponders. The description refers to a transponder monitor and/or interrogator, hereinafter "TMI". This term includes:

embodiments that feature a transponder monitor that monitors, for example an electromagnetic signal environment, for transmissions from a transponder but do not include a transponder interrogator function;

embodiments that feature a transponder interrogator that has the capability to send signals to trigger a response from a transponder, but do not include a transponder monitor function;

embodiments that feature both a transponder monitor and a transponder interrogator, which functions may be integrated together.

In some cases, the context will dictate that a particular embodiment includes both monitor and the interrogator.

The system allows the ECM system or its operator, which might be a person or another piece of equipment, to learn information about a transponder and/or a transponder owner. Such information might comprise for example the range, identity, status and/or tactical situation of protectees where each protectee is carrying a suitable transponder. Embodiments of the invention are equally applicable to land-based, maritime, and airborne electronic warfare and jamming.

In some embodiments, the TMI is integrated with the ECM system in the form of software stored in memory forming part of the ECM system, and run by a processor forming part of the ECM system, possibly with some hardware additional hardware and/or firmware. In some embodiments, the TMI is physically separate from the ECM system, each with its own antenna, but the two systems share a communication channel. In some embodiments, the TMI is physically separate from the ECM system but the two share an antenna and a communication channel. Each are discussed briefly below.

TMI as Software Embodiment

In some embodiments, the ECM system hosts the TMI in the form of software which controls the operation of the ECM system to periodically interrogate transponders, and as a separate point to process any signals received from transponders, which might be transmitted by a transponder either in response to interrogation signals from the ECM system, or in response to interrogation signals from another system, or spontaneously transmitted by the transponder. Referring now to FIG. 1, an example of such a system features ECM system 10 with TMI software 12 stored in memory 14 for execution by a processor 15. A feature of this embodiment is that the ECM system and TMI share an antenna. Thus, the TMI in this case includes the memory 14 with software 12, the processor 15, and the antenna 16. Elements 14, 15 and 16 have additional functions related to operation of an ECM system.

Range Measurement

Some embodiments include a range measurement capability. Where range measurement is provided in embodiments that feature a shared antenna between the ECM system and the TMI, then the range measurements will be relative to the notional centre of the ECM protection area. This will confer information about the expected ECM protection provided by the ECM system for each protectee, whether soldiers, vehicles or equipment. In some of these embodiments, the ECM system may be equipped with an auxiliary device such as a display to present transponder information to a user, or an auxiliary computer system which uses transponder information, such as indicated at 18 in FIG. 1. Some embodiments include the addition of some hardware features to the ECM system to allow it to host software which creates a TMI function native to the ECM system. An example of such hardware might be a software defined radio which is automatically controlled by the TMI software operating inside the ECM system, or by a manually operated button to engage/disengage operation of the TMI software.

Physically Separate TMI Embodiment

Figure 2:
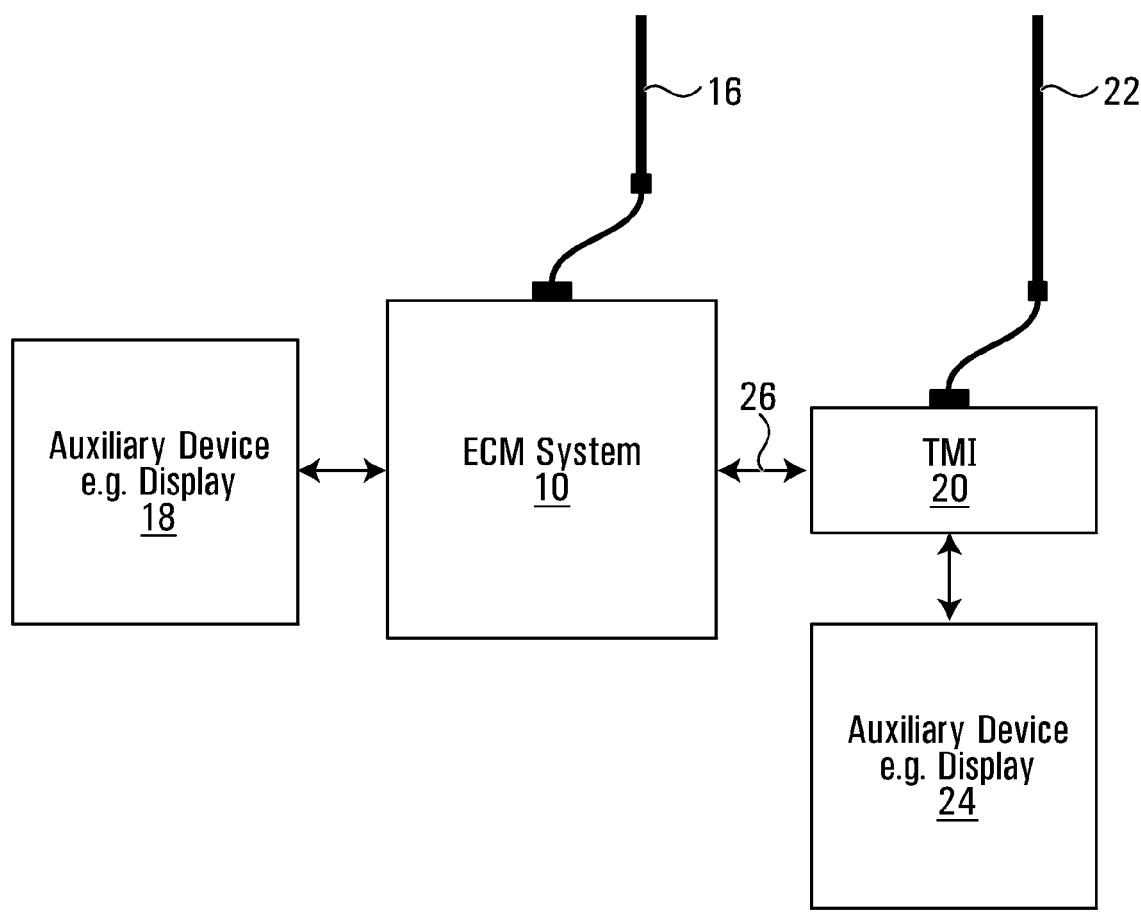
FIG. 2 is a system block diagram illustrating an embodiment of the transponder monitor and/or interrogator/ECM system in which the transponder monitor and/or interrogator is physically separate from the ECM system, but shares information with the ECM system.

In some embodiments, the TMI is physically separate from the ECM system and is, or might be considered, a stand-alone device, such that information is communicated from the ECM system to the TMI, or from the TMI to the ECM system, or both. Referring now to FIG. 2, an example of such a system features ECM system 10 and physically separate TMI 20. ECM system 10 has its own antenna 16, and may be connected to an auxiliary device 18 such as a display. In addition, the TMI 20 has its own antenna 22, and may also be connected to an auxiliary device 24, such as a display. The TMI 20 is connected to the ECM system 10 through a communications channel 26.

More generally, in such embodiments the TMI and/or the ECM system may be equipped with an auxiliary device such as a display to present information transponder information to an operator, or an auxiliary computer system which uses transponder information. In a specific example, the system features a separately-designed TMI and companion transponder, such that the TMI communicates with the ECM system by a wireless link using an established protocol, such as IEEE 802.11, also known as Wi-Fi, or by using Bluetooth.

Shared Antenna Embodiment

Figure 3:
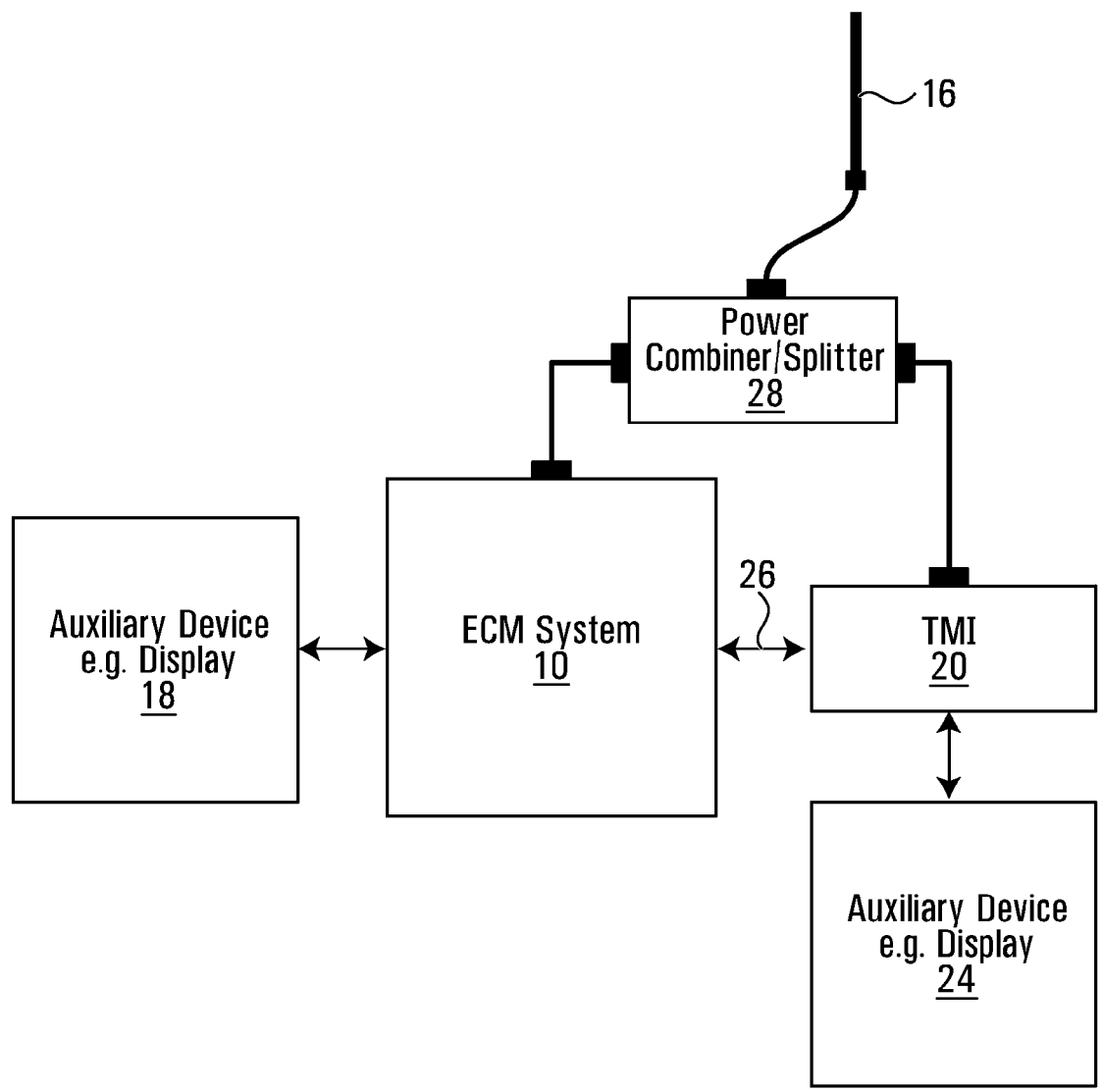
FIG. 3 is a system block diagram illustrating an embodiment of the transponder monitor and/or interrogator/ECM system in which the transponder monitor and/or interrogator is physically separate from the ECM system, but shares information with the ECM system and shares its antenna.

In some embodiments, the ECM system and parts or all of the TMI are physically separate, but share an antenna, so that range measurements are intrinsically relative to the origin of the ECM signal, and so are relative to the spatial origin of the ECM protection. This embodiment confers the shared-antenna advantages already mentioned for the embodiment in which the TMI function is integrated as software in the ECM system. An example is depicted in FIG. 3, which is the same as FIG. 2, but for the fact that the TMI 20 is connected to the ECM system antenna 16 through a power combiner/splitter 28, such that RF signals from the antenna are fed to both the ECM system 10 and the TMI 20, and signals from both the ECM system and the TMI are fed to the same antenna.

Range Estimation Relative to ECM Antenna Location

As detailed above, in some embodiments, range estimation relative to ECM antenna location is provided. Broadly speaking, the range between the ECM antenna and the transponder can be estimated by basic radar principles. In some embodiments, the present invention makes use of an approach taught in U.S. Publication No. 2012/068308, entitled "Semiconductor Device and Semiconductor Device Production Method" hereby incorporated by reference in its entirety, for so-called radiofrequency identification (RFID) radar, with which the range between an RFID reader antenna and an RFID tag can be estimated. By applying such an approach in the subject context, the time delay between transmission of an interrogating signal and reception of the transponder's response, together with knowledge of the speed of light and the latency of the transponder, where latency refers to the time delay between reception of the interrogating signal and transmission of the response, allows the distance from the ECM antenna to the transponder antenna to be estimated. The accuracy of the range measurement will depend on several factors, including but not limited to the following: 1) the accuracy with which the total signal flight time is measured, 2) the stability of the transponder latency, 3) the presence, geometry, orientation and reflecting/absorbing/transmission properties of spurious scatterers in the environment, 4) the ground-truth distance between the TMI's antenna and the transponder, and 5) possibly the number and time duration of a series of range measurements. In some embodiments, range uncertainty caused by transponder latency instability can be compensated by statistical analysis of a series of range measurements, if the mean and standard deviation of latency is known.

In some embodiments, the transponder is designed to have a stable latency time, i.e. a stable time delay between reception of an interrogating signal and transmission of its response. Knowledge of this latency time, together with the total measured time delay between interrogation and response, allows a device to calculate the distance between the interrogating antenna and the transponder's antenna. In some embodiments, the latency time of the transponder may be encoded on the transponder's RF response, whereas in others it may be implicit in the design of the transponder and also known or made known to the TMI. In some embodiments each transponder in a set of transponders might be assigned a different intentional latency value, to ensure that transponder responses are staggered in time and so do not flood the TMI. In some embodiments, knowledge of this latency may be used by the TMI to infer malfunction or functional absence of a transponder.

Detection of Transponder Identity

In some embodiments, the identity of the transponder and other information is encoded on the returned signal. For example, the transponder's RF response may contain coded information representing the protectee's identity or some aspect of their identity, either as a unique individual or identifying the individual as part of a distinct group.

In some embodiments, a software program run by the transponder is designed to encode the user's identity on each transmitted RF response, using RF encoding techniques familiar to anyone skilled in art, such as amplitude modulation or frequency shift keying.

Communication of Transponder Owner Information

In some embodiments, the transponder provides information about the status of the transponder owner, for example medical condition, the level of remaining consumables such as water, ammunition if the transponder owner is a person, or for example fuel level, ground speed, temperature or altitude if the transponder owner is a vehicle or piece of equipment. There are several possible sources of information about the status of a transponder owner, including sensors attached to the protectee or the transponder owner's equipment, or from the protectee himself by self-assessment. For example, in the case of consumables such as water or ammunition, the water canteen or ammunition magazines may be fitted with sensors and/or transponders, which automatically and periodically wirelessly or otherwise communicate with the transponder, which in turn communicates with its TMI. In the case of self-assessment, in some embodiments the transponder owner feels the weight of a water canteen to estimate its contents, or performs a visual count of remaining ammunition magazines.

In some embodiments, an auxiliary device comprising several finger-operated buttons, or a voice-activated/voice recognition device, is mounted for example on the picitiny rail of a rifle, and is linked to the transponder, for example wirelessly. In some embodiments the transponder owner presses one of several buttons, each dedicated to a different status message, to cause the transponder to transmit information to the TMI either immediately, or the next time the TMI interrogates the transponder. In some embodiments the button press is replaced by a voice command which is, for example, interpreted by voice recognition software embedded in the auxiliary device or provided by an adjunct processor. In some embodiments the transponder repeats the status message to the transponder until it receives acknowledgement from the TMI. In other embodiments, the status message is repeated by the transponder until the transponder owner cancels the message, for example by depressing a dedicated cancel button, or by speaking a "cancel" command.

Communication of Tactical Information

In some embodiments, the transponder provides information about the situation of the protectee, for example whether the protectee is in a life-threatening situation, or is mitigating a life-threatening situation for someone else. This can be implemented, for example, using functionality similar to that discussed above in the description of the communication of transponder owner information.

Choice of Transponder

In some embodiments, the transponder is an RFID tag. RFID tags can be used if, for example, the operator of the ECM system requires protectees to remain at ranges from the ECM antenna which are within the range at which an RFID tag can detect the ECM system's interrogating signal, and within the range at which the ECM system can detect the RFID tag's response signal. The detection range of a RFID tag is determined by the properties of both the tag and the reader (transponder monitor).

In some embodiments, a non-RFID transponder may be designed and built to allow flexibility according to specific mission and application requirements. This might be employed if the ranges of interest are substantially larger than the range at which an RFID tag can operate, such as might be the case for protection of consort seagoing vessels or consort aircraft, or protection of ground-based assets by aircraft or ships.

TMI/ECM System as Closed-Loop Feedback Control System

In some embodiments, any one of the information provided to the ECM system by the transponder is used by the ECM system to create a closed-loop feedback system in which the ECM characteristics or the characteristics of the transponder can be adjusted to, for example, control (for example through an optimization process) the protection of one or more protectees, or to improve the quality of information derived from transponder responses. A non-limiting set of example ECM characteristics that can be adjusted as a function of information provided by the transponder include, but are not limited to the following, where in each case an example embodiment is suggested to illustrate the broader underlying principles, and is not intended to limit the scope of the manner in which the information is used:

(i) ECM spatial position and orientation

Example: In some embodiments, the range between the ECM antenna and a transponder may be compared with a threshold range comprising a maximum permitted range, associated for example with an estimated range of ECM effectiveness. The difference between the threshold range and the current estimated range can be used to create an error signal which acts as a feedback signal for closed-loop control system which adjusts the range between the ECM system and the transponder. This adjustment could be effected for example either by moving the location of the ECM system, or by issuing electronic or verbal commands to the transponder owner to move closer to the ECM system. This can be used, for example, to monitor and correct positions of dismounted soldiers, vehicles or other at-risk assets relative to the ECM system, to ensure that standard operating procedures are observed, such as the maximum allowable range of a protectee from the ECM system, or that the currently-estimated ECM protection is acceptable for the current deployment positions of personnel, vehicles and at-risk assets.

(ii) the ECM signal's spectral characteristics

Example: In some embodiments, the ECM system and/or the transponder might include for example a function to estimate the geometry between the ECM antenna and transponder antenna, and the presence and characteristics of scatterers in the local environment. This requires measurement of ECM power at the transponder at different frequencies. This can, be done, for example by using the approach taught in the following patents: U.S. Pat. No. 8,184,036 B2, Canada patent 2,624,233, Australia patent 2008201111, and United Kingdom patent GB2449151, hereby incorporated by reference in their entirety. In such embodiments, control of the ECM system may reside in either the transponder or the ECM system. If control resides in the transponder, the transponder may request the ECM signal to transmit at different frequencies, where the demanded new frequency is the output of a closed-loop control system whose purpose is, for example, to find an ECM frequency which causes a null, or signal minima, at the transponder location in order to deduce, for example, the geometry between the ECM antenna and the transponder antenna, and the aforementioned characteristics of scatterers. If control of the ECM system resides within the ECM system, in some embodiments the transponder may for example encode in its response a measurement of the ECM signal power at the transponder location.

(iii) ECM antenna directive gain (for example, a directive ECM antenna could be pointed in a different direction, perhaps to improve protection of a given protectee)

Example: In some embodiments, the ECM system has an antenna which is electrically or mechanically steerable, and the ECM system estimates the ECM power delivered to a transponder location, or it may for example receive information about measured power from a transponder equipped to measure ECM power. If there is a threshold minimum ECM power which must be delivered to the transponder location, the difference between this threshold and the estimated or measured power at the transponder location may be used to create an error signal which can be used in a closed-loop antenna steering control system.

(iv) signal processing characteristics as might be related to the ECM technique and/or waveform Example: In some embodiments, the transponder measures the spectral characteristics of the ECM signal. If the transponder has prior knowledge of the ideal ECM spectrum, for example because this information was transmitted to the transponder or if prior knowledge were programmed into the transponder, then the difference between the ideal spectrum and the measured spectrum could be used to create an error signal which could then be used by the ECM system for closed-loop control of its spectral weighting. An example application is compensation for spectral colouration caused by multipath reflections, as can happen for high grazing angle geometries between the ECM system and transponder, or automatic selection of an ECM waveform with the best spectral characteristics from a limited set of available waveforms.

(v) commands sent to auxiliary systems, such as a directable gun, an automatic vehicle steering system, or command and control system which is itself attached to other systems.

In some embodiments, information such as the range between the ECM system and the transponder is used to form an automatic control system such as to regulate the distance of a vehicle from the ECM system, particularly when combined with an ECM effectiveness-range estimator (U.S. Pat. No. 8,184, 036 B2, Canada patent 2,624,233, Australia patent 2008201111, and United Kingdom patent GB2449151) which can estimate the maximum safe distance from an ECM antenna, and thus inferentially which vehicles may be at risk of RCIED attack. Considering this example, a maximum distance between the ECM system and transponder is known or programmed into the ECM system or the transponder, then the difference between the current range of the transponder from the ECM system and the maximum allowable range is used to form an error signal and a closed loop feedback system to control vehicle acceleration or braking, either by direct electromechanical control of the accelerator and/or brake, or in the form of instructions to a vehicle operator, where the instructions might be communicated by one or more common methods such as audio, visual, haptic, or by some other method.

In some embodiments, additional information provided to the ECM system by the transponder is used to improve the tactical situation of the transponder owner as indicated by some suitable index. For example, in some embodiments, the information is used to direct additional resources (for example ammunition, water, medical supplies, specialized equipment, etc.) or assistance (such as for example tactical support or medical assistance) to the transponder owner. Examples of information include, but are not limited to, the following:

(i) remaining levels of consumables, such as water or ammunition

Example: In some embodiments, some consumable containers such as water canteens or ammunition clips are fitted with sensors or secondary transponders, such as RFID tags, in such a way that they can be detected and monitored by the transponder. The transponder then periodically encodes information about the status of the consumables in its responses to the ECM system, or it transmits this information spontaneously to the ECM system. This may, for example, be done perhaps in response to preset thresholds below which the level of consumables should not fall. Alternatively, the level of consumables could be estimated by the transponder owner, such as by the weight of a water canteen, or a visual count of ammunition clips; in this case the transponder is equipped with, or connected with a mechanism for the owner to convey status information pertaining to the remaining level of consumables. For example, in some embodiments, the transponder is accompanied by a device comprising a series of buttons, each representing a different message to be sent to the ECM system. If for example transponder owner notices that his ammunition is nearly depleted, he might press a dedicated button to communicate this to the transponder (wirelessly or otherwise), which communicates it to the TMI/ECM system. Such an embodiment may also include a "cancel" button, to cancel the current status report should the state no longer be true, such as due to for example resupply of ammunition or water.

(ii) the medical status of the transponder owner

Example: In some embodiments, the transponder owner is fitted with sensors to measure one or more medical status indicators, for example heart rate, breathing rate, body temperature, skin temperature, or body orientation, such as standing, sitting, or lying down. Information from sensors is transmitted (for example wirelessly) to the transponder which encodes the information in its radiofrequency responses to the TMI/ECM system. As in the previous example, this information might be sent periodically in responses to the TMI/ECM system, or spontaneously by the transponder. Receipt of this information could be used to provide advice to the transponder owner, or to initiate remedial action. Logging of this information could be useful during post-mission analysis to determine the time and cause of death or injury, and to assess whether remedial actions or advice were effective.

(iii) the tactical situation of the transponder owner, such as whether he or she is in a life-threatening situation, or is within the effective zone of a jammer or other communication system Example: As already described, in some embodiments the TMI/ECM system may measure the distance to the transponder. In some embodiments this information is fed forward from the TMI/ECM system to the transponder, and decoded visually or by an audible message to the transponder owner informing him variously of his distance from the ECM system, or distance-to-go before reaching a maximum-allowed safe distance. Alternatively the Fed-forward information includes the transponder owner's position relative to other transponder owners, in the event that those positions are known by the ECM system or could be deduced from transponder responses. This may be employed in coordinating personnel and equipment movements during special operations, under circumstances in which coordination of time and location of soldiers and equipment is important.

Some embodiments of the present invention might be a functional part of a broader-scope device or system to create a soldier-centric tactical battlefield view for individual soldiers, where the broader-scope device or system includes a transponder which interacts with a TMI/ECM system.

Some embodiments are used to geolocate transponder owners whose position is unknown, by changing the position of the ECM system while monitoring the estimated range from the TMI/ECM antenna to a specific protectee, where identity information is positively provided by the transponder. As mentioned previously, the range information could be used as an error signal for a positioning loop controlling jointly or separately the ECM position and transponder position.

In some embodiments, the signal transmitted by the TMI/ECM system and the transponder response may both be received by a consort communication system which is remote from both the TMI/ECM system and the transponder. Further details are provided below. By comparing the time difference between reception of the two signals, the consort communication system can estimate the range and bearing of the transponder relative to itself. In some embodiments the estimate of transponder range relative to the consort communication system may be refined by using a time history of this locus may be used along with 1) an initial ground-truth value and 2) a mathematical model which constrains admissible solutions for movement of (a) the transponder and/or (b) consort and/or (c) the ECM system according to the known or estimated properties of each, such as minimum and maximum speed or direction. The absolute location of the ECM and/or consort communication systems may be included in calculations, as determined by for example a GPS receiver.

In some embodiments, range measurements by a single TMI/ECM system from multiple locations are used to triangulate the location of the transponder, where the location of the TMI/ECM system at the time of each measurement is known for example by using a GPS location device.

In some embodiments, range measurements from multiple TMI/ECM systems from single or multiple locations can be used to triangulate the transponder location.

In some embodiments the TMI/ECM system may have one or more separate directional antennas dedicated to transponder detection, which may be attached to the communication system either by a wire-type connection, or wirelessly. The separate directional antenna may be used in instances where directional detection of the transponder is desirable, such as might be the case if the transponder were for example a passive RFID tag with short detection range, used to mark for example a travel route or to indicate that a particular location such as a room or compound has been searched or otherwise qualified.

For clarity of illustration, FIGS. 4 to 7, and the detailed description thereof assume the use of an ECM system. More generally, any of the embodiments described herein has broader applications than ECM, including a wide variety of non-ECM communication systems which do not necessarily incorporate a native transponder detection and information-decoding capability.

Reactive Jammer

In some embodiments, at least the monitoring aspect of the TMI is achieved with a reactive jammer forming part of the ECM system. The term "reactive jammer" is here used to refer to a system which can be used to interfere with a transmitter-receiver pair, but only transmits an interfering signal when the transmitter of the transmitter-receiver pair transmits its signal, sometimes referred to as a trigger signal because its intention is to trigger its associated receiver. Broadly speaking, the operation of a reactive jammer proceeds in the following way: the jammer analyzes signals in the local environment and attempts to identify a signal or signals from a transmitter of interest, then transmits an interfering signal to prevent reception of the transmitter's signal. When the transmitter's signal stops, the jamming signal is automatically turned off. Such a jammer may have one or more of the following characteristics:

1) The jammer only transmits its interfering signal when a so-called trigger signal is present; this allows the RF power of the jammer to be concentrated in the frequency band in which it is needed, when it is needed; the rest of the time the system does not transmit an interfering signal, and may or may not transmit other signals. This allows a reactive jammer to conserve battery power compared with a jammer which transmits an interfering signal continuously, and allows it to offer maximum interference for minimum total transmitted power;
2) The jammer has a fast response time relative to the appearance of the trigger signal;
3) The jammer covers a broad frequency range, encompassing bands in which a hostile transmitter may appear;
4) The jammer has sufficient onboard computing power, in terms of memory, processing speed in terms of the number of numeric operations performed per second, and controlling software, also known as an operational program.

A reactive jammer is contrasted with a barrage jammer which is a transmitter that transmits continuously while it is on.

Some embodiments involve the use of a reactive jammer with a transponder unit that encodes information for receipt by the reactive jammer, additional to the transponder owner's identity, such as observation data unique to the transponder owner's location, including but not limited to the following: 1) measured ECM power, 2) the status of consumables accompanying the transponder such as ammunition, fuel or medicines, 3) the medical status of a dismounted soldier, and 4) estimated range of other nearby transponders.

Reactive jammers are used to counter radio controlled improvised explosive devices (RCIEDs). Typically, such a jammer passively monitors the RF environment over a broad frequency range, including frequency bands covered by civilian consumer electronics products, and including bands in which RFID tags and associated readers operate. In some embodiments, the transponder may be a passive or active (i.e. battery powered) commercial RFID tag.

In some embodiments, a reactive jammer, for example one designed to accompany troops on a mission, has an integrated TMI. In this case, the reactive jammer in effect implements any one of the TMI functionality. This creates a new capability without penalties such as significant additional weight, maintenance, and supply of prime power normally associated additional equipment.

In some embodiments, integration of the TMI with the ECM system is used to automatically provide a range measurement relative to the ECM antenna, which is an ideal reference point for estimating ECM protection since the protection originates from the antenna.

In some embodiments, integration of the TMI with the ECM system is achieved with no or negligible weight penalty to the jammer platform, particularly in cases where the ECM system is configured to operate as a transponder reader by a software change and/or minor hardware addition. There may also be a negligible weight penalty to protectees, who are required only to be fitted with a transponder, which can also be very light. This may be important in the case of for example man-portable jammers and dismounted troops.

In some embodiments, a reactive jammer covering a broad frequency range is used such that a transponder operating anywhere in the broad range can be employed. In some embodiments, the reactive jammer is selected/designed to operate over frequency bands coincident with commercially available RFID tags, in which case such commercially available RFID tags can be employed, which may afford cost savings in implementation;

In some embodiments, a reactive jammer that has the capability to detect weak signals in noisy environments is employed, such that they are suited to detecting signals from a low-power transponder.

Reactive jammers typically have an inherent flexibility in detecting and classifying signals. In some embodiments, commercial off-the-shelf (COTS) RFID tags are used, and the signal detection and classification capability of the reactive jammer is configured to detect the tags.

Some reactive jammers are designed to react very quickly when a signal of interest is detected. In some embodiments this capability is configured (and/or modified) to measure the very short time intervals comparable with the flight time of signals from the ECM system to the transponder and back.

Some reactive jammers incorporate significant computing power (i.e. many computer operations per second) which could be used for decoding transponder identity and other information encoded on the radiofrequency signal from the transponder, and performing range estimation.

Reactive jammers are typically designed to detect signals with high confidence and without prior synchronization in frequency or time with respect to a remote transmitter; for this reason, they are well-suited to detecting asynchronous arrival of responses from multiple transponders.

In some embodiments, acquiring range and other information and the use of that range to enhance and/or assure ECM protection proceeds in the following steps:

Step 1: The TMI (either the reactive jammer and/or a separate associated TMI component) transmits an interrogating signal intended to activate a response from the transponder of one or more protectees, and starts a timer to measure the transponder response time.

Step 2: The TMI (either the reactive jammer and/or a separate associated TMI) listens for the transponder response.

Step 3: If a transponder response is received before a timeout condition is violated, the response may be decoded to recover identity and other information if present. The signal flight time (i.e. the time delay between transmission of the transponder interrogation signal and detection of the response, minus the latency of the transponder in preparing and initiating its response transmission) is determined and used to calculate the approximate range of the RFID tag from the ECM antenna. Various signal processing techniques may be used to improve the estimated range, including but not limited to for example Kalman filtering, and the use of temporal (i.e. related to time) methods based on for example (a) the time history of range estimates and (b) internal software models which embody mathematical constraints on admissible solutions for the possible physical movement of protectees; for example, considering the case of a dismounted soldier, changes in position which exceed the expected ground speed of a dismounted soldier can be rejected as inadmissible, or equally changes of position which violate the minimum speed of a soldier, such as might happen in a forced march, or if the soldier is known to be in a moving vehicle.

Step 4: The identity, range estimate and other information may be recorded by the ECM system for future use, including but not limited to 1) support of a later forensic analysis of the joint activity of the ECM system and transponder owner, 2) improvement of range estimates, identity and other information during live operations. If a transponder response is not received before the timeout condition is violated, the loss of contact with the transponder may also be logged, on the grounds that the absence of a detected response may provide information as valuable as a detected response.

Step 5: The ECM system compares the current estimated range of the transponder with its current estimate of the maximum range at which it provides adequate protection.

Step 6: The ECM system reads the additional information provided by the transponder response, such as the remaining level of consumables, the medical condition of the transponder owner, the tactical situation of the tag owner, or any other such similar information deemed useful.

Step 7: Action is taken based on one or more of the detected identity of the transponder, the estimated range, and other information concerning the transponder owner. This action may take several forms, including but not limited to instructions transmitted verbally or electronically to the transponder owner, or action taken by the jammer such as relocating itself or changing its signal characteristics, such as for example altering the orientation of a directive antenna. This action may also be balanced against the estimated overall protection of all protectees and transponder owners, as determined by the ECM system and/or operator. The action taken may include dispatching additional consumables to the transponder owner, dispatching medical personnel, or providing reinforcements in the form of personnel and/or equipment.

Figure 4:
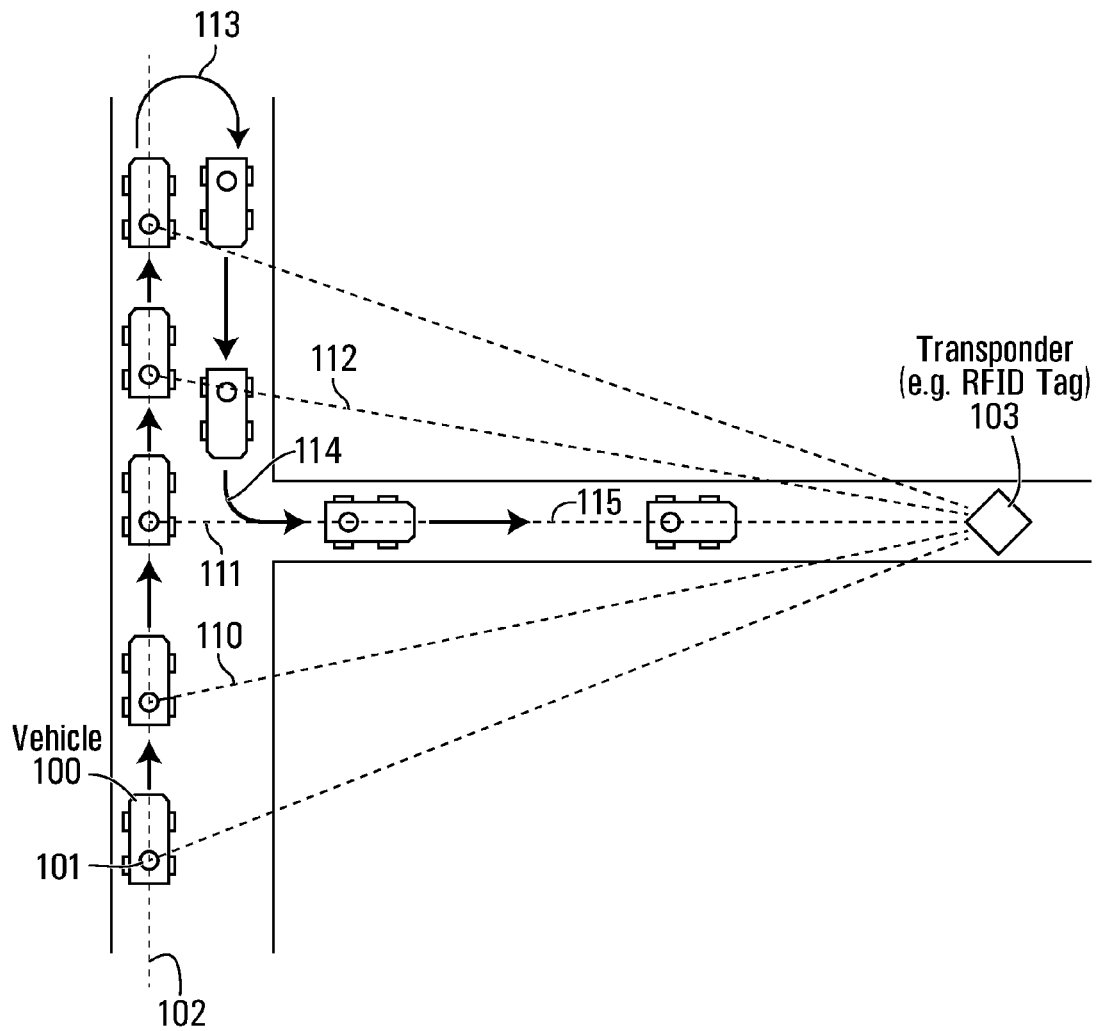
FIG. 4 is a diagram illustrating an example of how sequential range measurements are used by an ECM system as part of a guidance control loop to guide itself to the location of a remote transponder.
Figure 4:
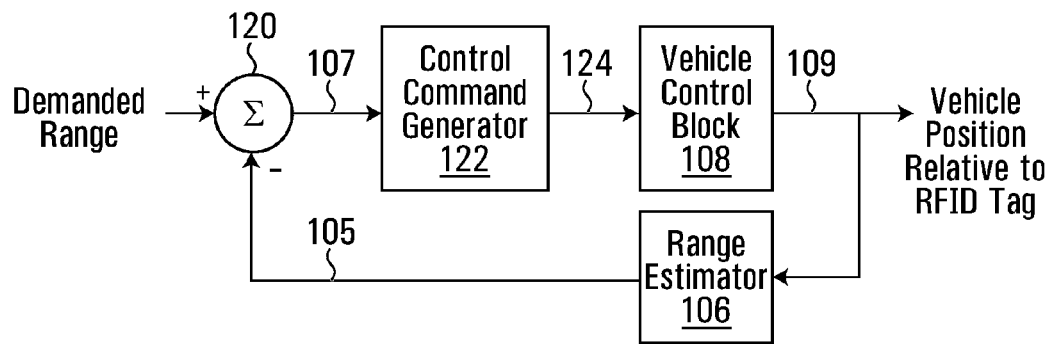

In some embodiments, the time history of range measurements is used as part of a feedback system for guiding a vehicle to the location of a transponder. An example of this is shown in FIG. 4. In the top part of the Figure, shown is a vehicle 100 equipped with an ECM system 101 proceeding on a path 102 to reach a transponder 103 physically remote from the vehicle. The ECM system 101 has, or is connected to, a TMI.

In the bottom part of the Figure, a control loop is shown which has as an input a demanded range between the ECM system 101 and a transponder such as transponder 103. The output 109 is the vehicle position relative to the transponder. The output 109 is input to a range estimator 106 which produces an estimated range 105 between the ECM system 101 and transponder 103. Combiner 120 combines the demanded range with the range estimate 105 to produce an error signal 107 which is input to a control command generator 122. The control command generator 122 transforms the error signal 107 into vehicle control commands 124 in the form of for example steering commands, braking and acceleration. A vehicle control block, representing the part of a vehicle that is being controlled, such as the brake, acceleration or turning systems, is depicted at 108. Vehicle control block 108 receives the vehicle control commands 124, processes them to control the vehicle accordingly, and in turn transforms commands 107 into vehicle position 109, which affects range estimates 105.

In operation, suppose a vehicle 100 is moving forward with the purpose to drive to (or within a defined distance of) the location of a transponder 103. An initial range measurement 110 may be observed to decrease to a different value 111 and thereafter increase to a new value 112. The error signal 107 can be used to control the vehicle control block 108 to cause the vehicle 100 to reverse direction 113, and turn 114 down a different path 115 to reach the transponder 103.

It is useful to consider two cases in which the location of a transponder relative to the area protected by the ECM system can be determined by the combination of an ECM system and TMI: in the first case, the ECM system and TMI are moving and the transponder is stationary or nearly stationary; in the second case the reverse is true: the ECM system and transponder are stationary or nearly stationary, and the transponder is moving. Both cases are treated below.

Case 1: Moving ECM System, Stationary or Nearly Stationary Transponder

Figure 5:
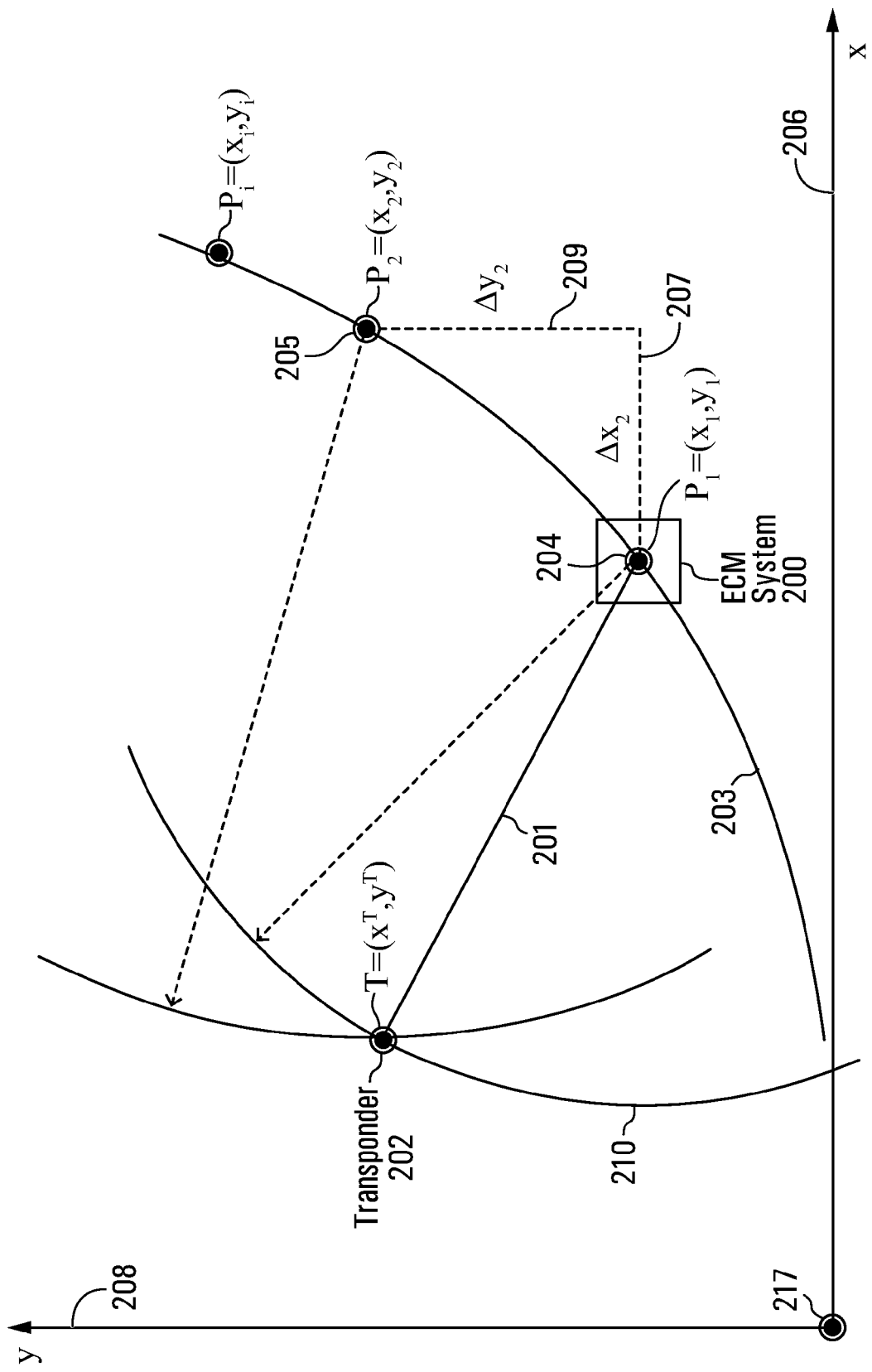
FIG. 5 is a diagram illustrating how the location of a transponder is deduced using range measurements made by a single moving ECM system, or by using range measurements made by multiple stationary ECM systems.

In some embodiments the location of a transponder which is known or believed to be stationary or nearly stationary is triangulated by a moving ECM system. In some embodiments, the method proceeds in the following steps, where example geometry is illustrated in FIG. 5. The main elements are the ECM system 200, and a transponder 201, an example of which is an RFID tag. The solution is the $(x^T, y^T)$ coordinates of the transponder 202 at its current location.

Step 1: The ECM system 200 measures the range 201 to the transponder 202 as the ECM system traverses a path 203. To illustrate the principle by which multiple measurements are used, a first range measurement occurs at a general point $P_1$ 204 defined relative to a coordinate system having origin 217, for example a coordinate system whose origin 217 is coincident with an initial ECM position. Position $P_1=(x_1, y_1)$ can be thought of as changes of position $\Delta x_1, \Delta y_1$ relative to the origin 217. As the ECM system 200 changes location from point $P_1$ 204 to point $P_2$ 205 along the path 203, it changes location in the x-direction 206 by length $\Delta x_2$ 207, and in the y direction 208 by length $\Delta y_2$ 209. A second range measurement occurs at point $P_2$ 205. Further range measurements occur at points $P_3, \ldots, P_i$, where the number of measurements is i. The ECM system records the range to the transponder at i different locations, and calculates the change of range between each range measurement.

Step 2: A system of i simultaneous equations is created representing the range 201 measured at each point $P_1, \ldots, P_i$ on the path 203 followed by the ECM system 200. Using the variables and notation presented in Step 1 and illustrated in FIG. 2, and notation familiar to practitioners skilled in the art of mathematics, the i simultaneous equations can be expressed in the following form:

$$R^2_p = (\Sigma_{n=1}^{p} \Delta x_n - x^T)^2 + (\Sigma_{n=1}^{p} \Delta x_n - x^T)^2, \text{ where}$$
$$p=1,\ldots,i \qquad \text{Equation (1)}$$

$R_p$=pth measured range from the communication system to the transponder $x^T$=x position of the transponder, in a stationary or "world" coordinate frame $y^T$=y position of the transponder, in a world coordinate frame $\Delta x_i$=change of x-position of communications system since the previous measurement, or relative to the origin for p=1

$\Delta y_i$=change of y-position of communications system since the previous measurement or relative to the origin for p=1

Equation (1) arises from the following derivation:

A single range measurement at for example point $P_1$ 204 establishes a locus of points 210, relative to the ECM system 200, on which the transponder 202 must lie. The locus is a circle, concentric with the ECM system 200. The general form of this circle can be expressed mathematically by equation (2a), familiar to practitioners skilled in the art of mathematics:

$$R^2 = (x_1-x)^2 + (y_1-y)^2 \quad \text{Equation (2a)}$$

where:
R=measured range of transponder from ECM system
$x_1$=x position distance of the ECM system from world coordinate frame origin 217
$y_1$=y position distance of the ECM system from world coordinate frame origin 217

Any of the points $P_p$ ($x_p$, $y_p$) can be expressed as the sum of the x-direction 206 position changes 207 and y-direction 208 position changes 209 as shown in equations (2b) and (2c):

$$x_P = \Sum_{n=1}^{p} \Delta x_n - x^T, \text{ where } p=1, \ldots, i \quad \text{Equation (2b)}$$

$$Y_p = \Sum_{n=1}^{p} \Delta y_n - y^T \text{ where } p=1, \ldots, i \quad \text{Equation (2c)}$$

Substituting equations (2b) and (2c) into equation (2a) yields equation (1).

Step 3: Solve the i simultaneous equations represented by equation (1) for the position of the transponder, $x^T$, $y^T$ 202 relative to a coordinate system having origin 217, using normal computational methods familiar to practitioners skilled in the art of computer algorithm implementations of mathematical methods for solving simultaneous equations with embedded nonlinearities, such as the Newton-Raphson method, generalized to two variables.

Step 4: Filter the solutions according to admissible solutions. In general, several solutions may satisfy the system of simultaneous equations represented by equation (1); some may be ruled inadmissible and may be discarded.

There are multiple methods for discarding inadmissible solutions depending on the additional information at hand which may be used by a practitioner skilled in the art of tactical geolocation, such as visual inspection of the operating area, processing of video signals of the operating area, the use of terrain knowledge such as the location of cliffs, hills, rocks, or bodies of water, or operational knowledge; for example if the transponder is known to be in a particular area, solutions outside that area are inadmissible.

This methodology can also be used if there are two or more communication systems able to simultaneously, or nearly simultaneously, acquire range measurements of the transponder and share the measurements, and if the location of the two systems are known relative to a common reference point, such as a coordinate frame origin 217. In this case, the number of simultaneous equations i is equal to the number of systems, and equation (1) can be immediately formed and solved without a time delay necessary for a single ECM system to traverse the path 203. The estimate of the transponder location can be formed relative to a convenient reference point common to all ECM systems. Alternatively, it is possible to use this method with multiple range measurements from each of multiple ECM systems, since the method embodied in the aforementioned steps does not depend on the source or timing of the range measurements. In this case, the number of simultaneous equations is equal to the total number of measurements provided by all ECM systems.

Case 2: Stationary or Nearly Stationary ECM System, Moving Transponder

Figure 6:
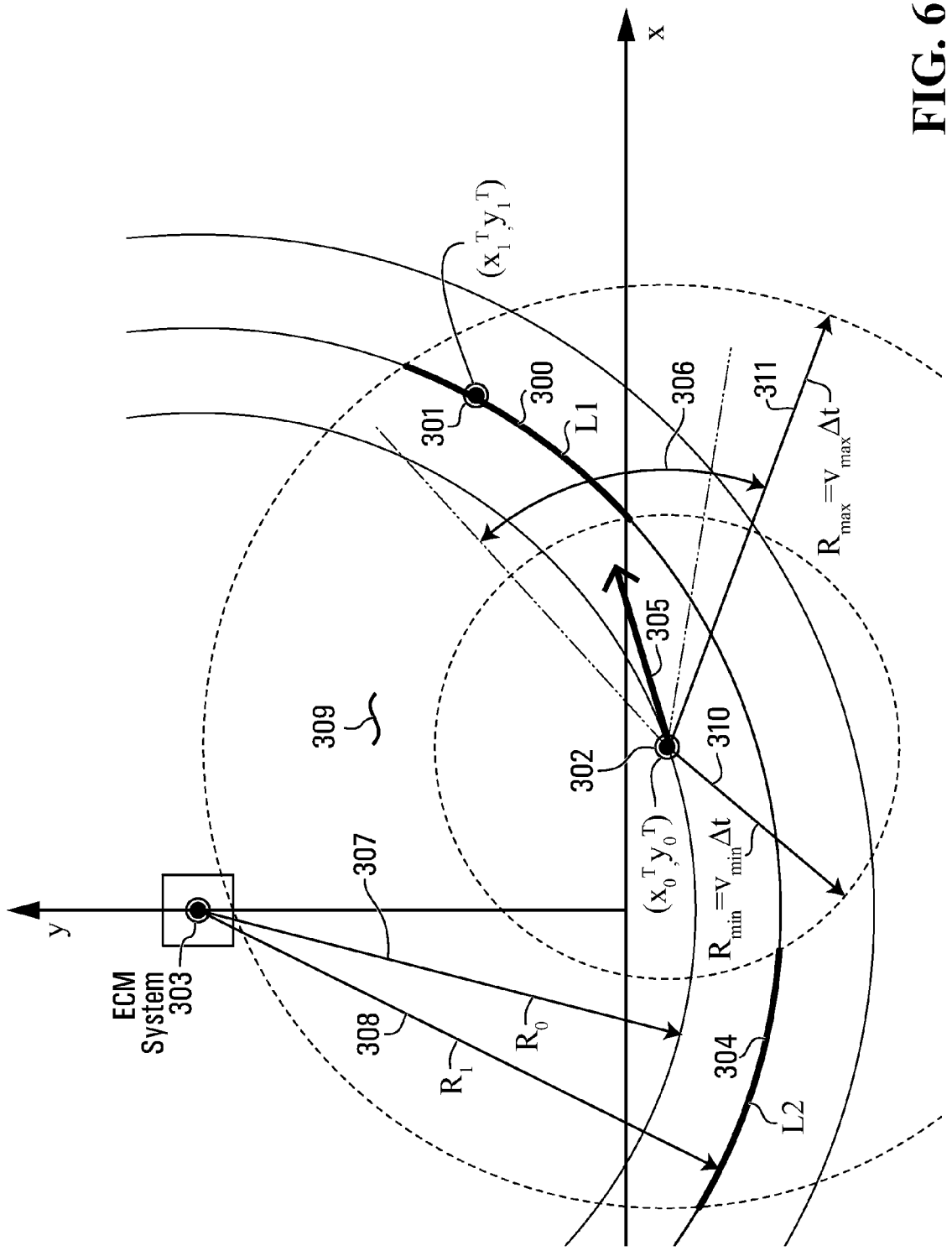
FIG. 6 is a diagram illustrating how a single stationary ECM system deduces the location of a moving transponder by using changes in range measurements over time.

In some embodiments the trajectory of a moving transponder is triangulated by a stationary or nearly stationary ECM system. In such scenarios the ECM system estimates the change of transponder position between two range observations. The general problem arrangement is illustrated in FIG. 6.

The solution is a line L1 300 which is believed to hold the true current transponder position ($x_1^T$, $y_1^T$) 301, relative to an earlier estimated position of the transponder ($x_0^T$, $y_0^T$) 302. The line L1 300 is calculated by using 1) one or more range measurements made by an ECM system 303 embedded in a world coordinate frame 309, and 2) lower and upper bounds on the average speed of the transponder 302 between the initial observation time $t_0$ and a later time $t_0+\Delta t$ at which the transponder position is to be estimated. FIG. 6 illustrates the case of a single range measurement at time $\Delta t$ later. Average speed is used here as a trivial example of a more general approach in which the movement profile of the transponder is estimated during the interval of interest, perhaps based on a series of previous observations and estimated positions. FIG. 6 illustrates a case in which the minimum average velocity $v_{min}$ is nonzero, which means that line L1 300 does not include the initial estimated position of the transponder ($x_0^T$, $y_0^T$) 302. The point on L1 300 closest to the initial estimated point ($x_0^T$, $y_0^T$) 302 is at a distance $R_{min}=v_{min} \Delta t$ 310. The point on line L1 300 farthest from the initial estimated point ($x_0^T$, $y_0^T$) 302 is at a distance $R_{max}=v_{max} \Delta t$ 311, where $v_{max}$ is the estimated maximum velocity of the transponder. The minimum distance $R_{min}$ 310 and maximum distance $R_{max}$ 311 are examples of constraints on admissible solutions for points on the line L1 300; other constraints may be used.

In the absence of additional information, solutions comprising the line L1 300 are ambiguous with a second line L2 304, because the direction of the transponder 301 movement is unknown. If the bearing 305 of the transponder's velocity is known or can be bounded or can be estimated to lie within an angular window 306 relative to the bearing 305, this information might be used to render solutions comprising either L1 300 or L2 304 inadmissible.

The lines L1 300 and L2 304 are defined by three simultaneous equations in a manner similar to that already described for the case of a stationary or nearly stationary ECM system, in equation (1):

$$(x_0^T - x_p)^2 + (y_0^T - y_p)^2 = R_0^2 \quad \text{Equation (3a)}$$

$$(x_1^T - x_p)^2 + (y_1^T - y_p)^2 = R_1^2 \quad \text{Equation (3b)}$$

$$v_{min} \Delta t \leq \sqrt{(x_1^T - x_0^T)^2 + (y_1^T - y_0^T)^2} \leq v_{max} \Delta t \quad \text{Equation (3c)}$$

Where:
$R_0$ 307=initial measured range from the ECM system 303 to the transponder 302 at time $t_0$
$R_1$ 308=measured range from the ECM system 303 to the transponder 302 at time $t_0+\Delta t$
$x_0^T$=initial x-position of the transponder 302 in a world coordinate frame 309 at time $t_0$
$y_0^T$=initial y-position of the transponder 302 in a world coordinate frame 309 at time $t_0$
$x_1^T$=x-position of the transponder 301 in a world coordinate frame 309 at time $t_0+\Delta t$
$y_1^T$=y-position of the transponder 301 in a world coordinate frame 309 at time $t_0+\Delta t$
$\Delta t$=time delay between initial range measurement and time at which transponder position is desired to be known
$v_{min}$=minimum expected average velocity of transponder 302 from time $t_0$ to time $t_0+\Delta t$
$v_{max}$=maximum expected average velocity of transponder 302 from time $t_0$ to time $t_0+\Delta t$ $x_p$=x-position of the ECM system 303 in a world coordinate frame 309

$y_p$=y-position of the ECM system 303 in a world coordinate frame 309

The velocity constraints $v_{min}$ and $v_{max}$ comprise minimum and maximum bounds on the expected velocity of the transponder; for a first example, in the case of a transponder attached to a dismounted soldier, the minimum velocity may be zero and the maximum velocity may be the highest expected walking or running velocity. For a second example, in the case of a transponder attached to a moving vehicle, the minimum and maximum average velocities may be computed by the transponder using a secondary geolocation device, such as a global positioning system, or a computer attached to a speedometer, and may reflect the estimated accuracy of the measured velocity.

Equations (3a), (3b) and (3c) may be solved to yield lines L1 300 and L2 304 by using numerical methods familiar to practitioners skilled in the art of mathematics. Solution disambiguation can be similarly accomplished if the bearing of the transponder motion is known, or can be bounded or estimated.

Regarding the present problem, these methods can be used to produce bounded estimates of the transponder location, based on intermittent observations of transponder range, where the quality of the final estimates will depend on (a) the reliability and accuracy of the range measurements, and (b) the specific algorithmic techniques used for estimation.

In the absence of additional information the final solution will have rotational ambiguity in the world coordinate frame 309, i.e. the solution is equally valid for any rotation centred on the location of the communication system.

In some embodiments, the location of a transponder can be accomplished by triangulation using a second TMI/ECM system or any other communication system equipped with its own transponder, where such a system is here referred to as a "consort" of the primary TMI/ECM system. For purposes of this illustrative explanation of an example embodiment with the understanding that other embodiments are possible to achieve the same result, in addition to having its own transponder the consort has three capabilities: 1) it is able to detect the transponder interrogation signal transmitted by the primary ECM system, also 2) it is able to detect the response of a transponder to that interrogation signal, and 3) it is able to compute time delays between transmission and receipt of signals, and receipt of multiple sequential signals, with accuracy adequate to estimate range in the manner already described, broadly speaking.

Figure 7:
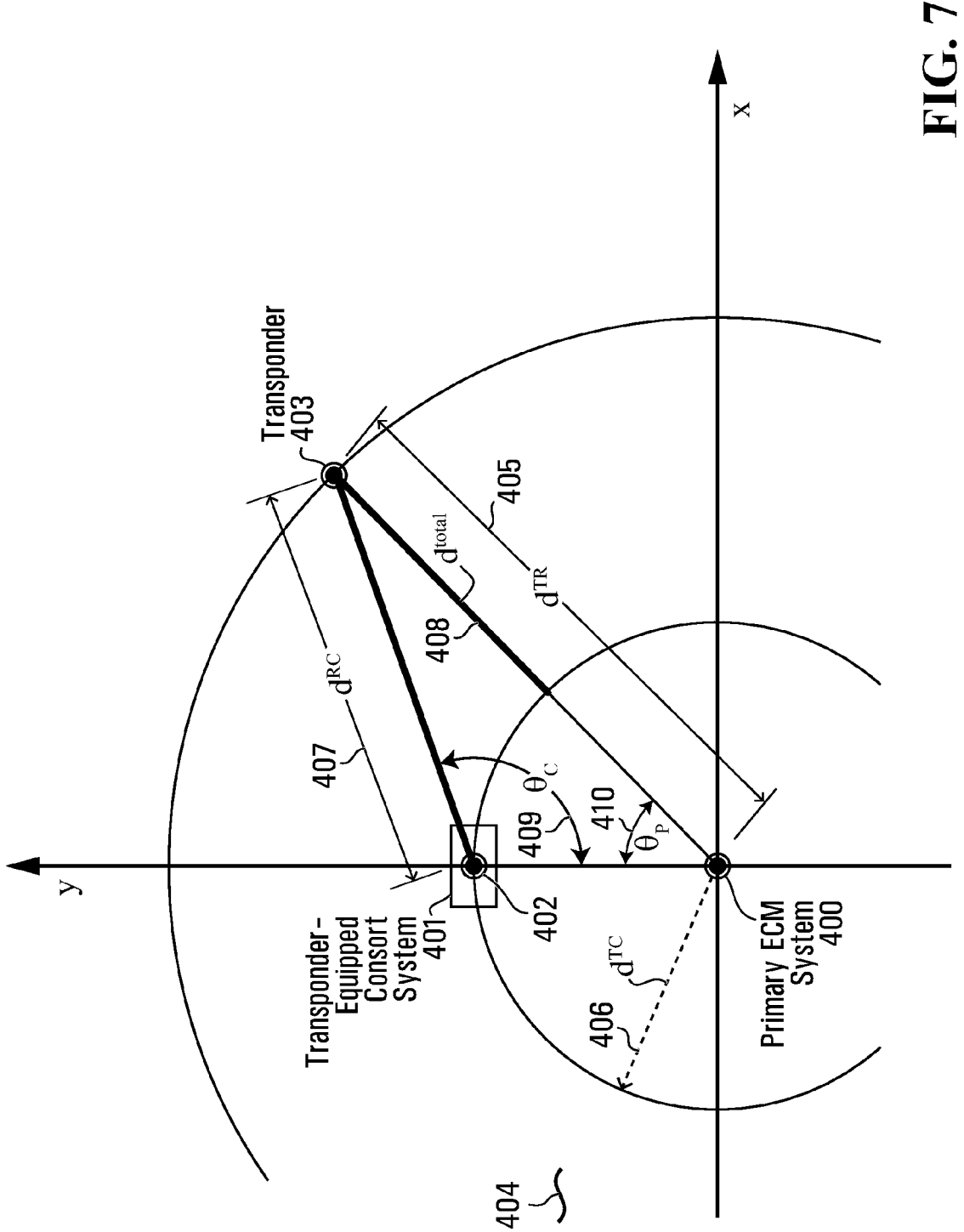
FIG. 7 is a diagram illustrating how the range and bearing of a transponder is deduced with the assistance of a remote consort equipped with a two-way transponder, by using range measurements made by the ECM system of the consort and transponder, together with range measurements made by the consort of the transponder.

Referring to FIG. 7, the depicted scenario comprises three entities:

1. an ECM system 400
2. a second so-called consort system 401 equipped with a first transponder 402
3. a second remote transponder 403.

For clarity and brevity, the transponder 402 of the consort system 401 shall be referred to as TC 402 (Transponder-Consort), the remote transponder 403 shall be referred to as TR 403 (Transponder-Remote), and the TMI/ECM system shall be referred to as the ECM system.

The ECM system and TC 402 are configured such that information can flow from the ECM system 400 to TC 402 and vice versa.

In order to determine the location of TR 403 in a world coordinate frame 404 it is desirable to determine the distances $d^{TR}$ 405, $d^{TC}$ 406 and $d^{RC}$ 407. If these values are known or can be deduced, the location of the transponder TR 403 can be calculated using the Cosine Law, familiar to practitioners skilled in the art of mathematics. Since the speed of light is constant, the problem reduces to finding the following time delays:

$\Delta t^{TC}$=time delay between transmission of ECM system 400 interrogation signal and reception of interrogation signal by TC 402

$\Delta t^{TR}$=time delay between transmission of ECM system 400 interrogation signal and reception of interrogation signal by TR 403

$\Delta t^{RC}$=time delay between transmission of response signal by TR 403 and reception of response signal by TC 402

In the initial step of this method, the ECM system 400 transmits a transponder interrogation signal which is received by the TC 402 and TR 403. Both TC 402 and TR 403 separately respond to this interrogation signal by each transmitting a response signal. Because TC 402 is equipped to receive transponder responses, the response signal transmitted by TR 403 is received by TC 402.

TC 402 uses the time at which it received the interrogation signal from the ECM system 400 as a reference against which it computes the time delay to receipt of the response of TR 403 to the ECM system 400 interrogation signal. In some circumstances the response signal from the transponder TR 403 may be received by TC 402 before it receives the interrogation signal from the ECM system 400, in which case this time forms the reference for computing the time delay. This time delay is denoted $\Delta t^{total}$, and equals the sum of two times: 1) the differential flight time of the interrogation signal from the ECM system 400 to TR 403 relative to the time the same interrogation signal was received by TC 402, plus 2) the flight time of the response signal from TR 403 to TC 402. $\Delta t^{total}$ can be expressed mathematically as:

$$\Delta t^{total} = (\Delta t^{TR} - \Delta t^{TC}) + \Delta t^{RC} \quad \text{Equation (4)}$$

The time values in equation 4 can be converted to distance values since the speed of light is a constant, yielding the following distance-based equation, ignoring transponder response delays, also referred to as latencies, and possible multipath issues:

$$d^{total} = d^{TR} - d^{TC} + d^{RC} \quad \text{Equation (5)}$$

Where:

$d^{total}$ 408=the sum of two distances: 1) the difference between the radial range of TR 403 from the ECM system 400 and the radial range of TC 402 from the ECM system 400, plus 2) the radial distance from TR 403 to TC 402

$d^{TR}$=distance between the ECM system 400 and the remote transponder TR 403

$d^{TC}$=distance between the ECM system 400 and the consort TC 402

$d^{RC}$=distance between the remote transponder TR 403 and the consort TC 402

$d^{TC}$ and $d^{TR}$ can be computed by the ECM system 400 by measuring the time delay between transmitting an interrogation pulse and receipt of a response from TC 402 and TR 403 respectively, accounting for intrinsic transponder latencies, possible multipath effects, and the fact that the signals must travel the distance between the ECM system 400 and a transponder twice: outbound from the ECM system 400 to the transponder, and back from the transponder to the ECM system 400.

The value of $d^{RC}$, the radial distance from TC 402 to TR 403 can be computed by TC 402 if the ECM system 400 transmits to TC 403 the differential distance $d^{TR} - d^{TC}$. An expression for $d^{RC}$ is obtained by rearranging the terms in equation (5):

$$d^{RC} = d^{total} - d^{TR} + d^{TC} \quad \text{Equation (6)}$$

The value of $d^{RC}$ can then be used by the consort 401 or its transponder 402 with the Cosine Law to determine the bearing of TR 403 relative to the line of sight between the consort 401 and the ECM system 400. Alternatively the value of $d^{RC}$ can be transmitted by TC 402 to the ECM system 400, and the ECM system 400 can perform a similar calculation. Since the bearing and range of TR 403 are known, its position is known.

Equally, the bearing from the TR 403 to either the consort TC 402 or the ECM 400 system can be computed.

This method a specific example of a general function to determine the distance between two remote terminals by their response to a common interrogation signal, received by free-space transmission; in some embodiments, adjustments are made to account for intrinsic system delays, timing uncertainties, spurious environmental reflections (also commonly called multipath), or other complicating effects.

Range and bearing determinations can be computed using the following steps:

1. The ECM system 400 transmits an interrogation signal ("ping") to all transponders.
2. The consort transponder TC 402 receives the ping, and records the time delay between receipt of the ping and receipt of the response from remote transponder TR 403.
3. The ECM system 400 receives the response from TC 402 and TR 403, and computes the range estimates for TC 402 and TR 403.
4. The ECM system transmits second ping on which is encoded the ranges of both TC 402 and TR 403.
5. The consort transponder TC 402 decodes the range values and uses them to compute the range from itself to the remote transponder TR 403.
6. With all three sides of triangle known, in some embodiments the consort 401 or its transponder TC 402 computes bearing $\theta_C$ 409 to TR 403 relative to line of sight from itself to ECM system.
7. In some embodiments the consort or its transponder TC 402 sends the range of the remote transponder TF 403 relative bearing $\theta_C$ 409 back to the ECM system, encoded on its response to the second ping transmitted by the ECM system 400; the ECM system 400 computes bearing $\theta_P$ 410 of transponder relative to line of sight from itself to the consort 401 or its transponder 402. In some implementations, the range and relative bearing information may be transmitted to the consort 401 or its transponder TC 402 for refinement/confirmation, and/or to the remote transponder TR 403.
8. Continuous updates of the position of the remote transponder TR 403 may be obtained by repeating the above process beginning at Step 1.

In the embodiment described above, estimates of the remote transponder TR 403 bearing and range relative to the consort 401 or its transponder TC 402 and the ECM system 400 are applicable to the time of the previous ping, i.e. range and bearing estimates lag the ping sequence by one step.

In some embodiments additional processing may be used by the Consort and/or the ECM system to refine the estimated ranges and/or bearings, such as the use of multiple estimates distributed in time to produce a refined estimate, or filtering techniques such as Kalman Filtering may be used.

The process described above can be repeated with several transponders and/or primary communication systems and/or consort communication systems to create a tactical picture of the range and relative bearing of each transponder-equipped agent.

In some embodiments, the roles of consort transponder TC 402 and the remote transponder TR 403 may be interchanged, to provide added confidence in range and bearing estimates, i.e. TR 403 in FIG. 7 may report to the ECM system 400 the time delay between receipt of the ECM system 400 interrogating signal and receipt of the TC 402 response, and may ultimately transmit its own estimates of bearing and range estimates for both the TC 402 and the ECM system 400, to the ECM system 400.

In some embodiments, the method above is extended to create a network in which the roles of consort and remote transponder are undertaken by all transponder owners, so that the ECM system may receive and/or derive range and bearing estimates based on time delay observations by a network of consorts and remote transponders, where the involved time delays, illustrated in the above example embodiment, are between receipt of the interrogating ping from the ECM system, and receipt of responses from various remote transponders, including transponders associated with consorts.

The above example is illustrative only; other implementations and elaborations are anticipated by practitioners skilled in the art of geolocation, electronic warfare, and communication system engineering, including implementations which may not require forward and/or backward communication between remote transponder, consort, or the ECM system.

In some embodiments, the ECM system may communicate the ECM protection status to the transponder by means of a suitably coded signal, using a method such as optical, infrared, radiofrequency, acoustic means, or by some other method, where the term "protection status" refers to the ECM system's estimate of its ability to affect the operation of a communications system, such as a radio controlled improvised explosive device (RCIED), bearing in mind that the example of an ECM system and a RCIED are here used as an illustration of cases in which a primary communications system estimates its effect on a separate cooperative or non-cooperative communications system. Other examples of a non-cooperative communication system subject to jamming are the seeker of a radar homing missile, an enemy radio, an enemy ECM system, an enemy transponder network, or an enemy drone which uses a radiofrequency link for any purpose.

In some embodiments, the transponder may be associated with an auxiliary piece of equipment carried by the transponder owner, where the purpose of the transponder is to decode information from the ECM system and communicate that information to the transponder owner. This might be achieved, for example, by a method such as haptic actuators in a belt, helmet, or vest, or visual stimulation such as lights, or by sound, or by some other method. Transduction of information by such means are familiar to practitioners skilled in the art of electronics engineering.

In some embodiments, the ECM system is configured to, in at least some instances, provide information to fewer than all transponder owners, and instead is configured to provide information to a selected privileged subset of transponder owners concerning for example the estimated protection of the selected transponder owners and/or the estimated protection of other agents who are not transponder owners, to provide a more complete tactical picture to these selected transponder owners. In some embodiments, the selection of privileged transponders may change from time to time according to certain criteria. Those criteria may themselves vary from time to time.

In some embodiments, the ECM system may provide tactical information to a control centre, remote from the transponder owners, describing the current estimated ECM protection for all or some transponder owners, to provide a more complete tactical picture to upstream agents, e.g. a higher command authority relative to the authority of the ECM system.

In some embodiments, one or more of the methods/systems described herein is used for deconfliction of friendly fire, i.e. to prevent friendly troops firing on friendly troops. If a jammer or set of jammers can determine the location of friendly assets (e.g. dismounted soldiers, vehicles or equipment) in real-time, including asset identification and time stamp for that information, it may be possible to lower the probability of casualties and/or battle damage caused by friendly fire by providing real-time feedback to involved troops, whether mounted or dismounted, or to remote platforms such as aircraft, surface ships, submarines, or drones of any kind. This also applies to vehicles, equipment and other assets, and in some implementations when the ECM system or auxiliary ECM equipment is airborne, such as when carried on a drone.

In some embodiments, the information recorded in association with one or more of the systems/methods described herein is used in post-engagement forensic analysis to confirm/disconfirm friendly fire casualties; this also applies to combat loss of other assets such as vehicles, equipment, and non-government organization (NGO) personnel and/or equipment. Information about the relative locations of friendly forces during combat, particularly date and time stamped data, might provide useful, high-confidence evidence in trying to determine the cause of combat losses.

In some embodiments, post-engagement forensic analysis is performed with a user-selectable information granularity, if the ECM system records all tag/transponder-related data. Examples of the information granularity options for forensic analysis include:

Individual Level: Forensic analysis of information at this level concerns the relationship between an individual and a single ECM system.

Platoon Level: Forensic analysis of information at this level concerns the relationship between, and status of, individuals in a group serviced by a networked communications system, where network comprises one or more communication systems and one or more transponders, and where the word "platoon" is intended to convey the idea of a group of individuals.

Battalion Level: Forensic analysis of information at this level concerns the relationship between two or more groups of individuals, and where the word "battalion" refers to a group of groups of individuals Brigade Level: Forensic analysis of information at this level concerns the relationship between two or more battalions, and where the word "brigade" refers to a collection of groups of groups of individuals.

In some embodiments, the present invention is used as a training aid. Real-time feedback of the approximate ranges and positions of dismounts and/or vehicles and/or equipment could be used as a training aid in training exercises. Data recorded can be used to provide the basis for a forensic analysis of the progress and outcome of war games, either in real-time or after the training exercise has concluded.

In some embodiments, several devices which each host a transponder may be networked together in real-time or near real-time, to give a clearer, more confident tactical picture of various attributes of the transponder owners and other attributes of the combat engagement observable by the transponder owner, including but not limited to range, bearing relative to the ECM system embedded in a fixed coordinate system attached to the operating area, the transponder owner's identity, medical status, vital signs such as heart rate and breathing rate, ammunition status, current operational activity or status, geolocation as indicated by a separate independent sensor, or estimated level of personal danger.

In some embodiments, an imaging device such as a video camera is combined with object recognition software to identify physical objects which do or may affect the ECM system's effectiveness. The objects may or may not be associated with a transponder. For example, the optical device may identify a structure which obstructs or interferes with the ECM system's signal, and may so advise a transponder owner who is in close proximity to the object that the ECM coverage in the area near the object may be compromised. The veracity of predictions by such an embodiment, and subsequently the confidence of such estimates in the absence of confirming measurements, may be enhanced if the transponder is capable of measuring the ECM signal at is location, and communicating that information back to the ECM system.

In some embodiments, an imaging device such as a video camera is used with object recognition software to identify transponder owners, for example using a dyed marker or flashing beacon, in which the ground-truth positions of transponder owners in the image are initially designated, and subsequently followed automatically in the image by a combination of image recognition software and information provided by the TMI/ECM system and transponder. This information might include, but is not limited to, the range from the TMI antenna and/or ECM antenna to the transponder, the identity of the transponder owner so that its shape can be classified by object recognition software (e.g. man, vehicle, equipment), and the orientation of the transponder owner (e.g. man lying down, man standing).

Numerous modifications and variations of the present application are possible in light of the above teachings. It is therefore to be understood that within the scope of the appended claims, the embodiments of the application may be practiced otherwise than as specifically described herein.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A system comprising:
an ECM (electronic counter measures) system;
a transponder monitor connected to or forming part of the ECM system;
wherein the system is configured to:
  transmit, with the ECM system, ECM signals for rendering a hostile electronic warfare system ineffective;
  monitor, with the transponder monitor, for a transponder signal from a remote transponder of a potential protectee of the ECM system; and
  at least one of:
  i) determine information based on the transponder signal and make use of the information in the ECM system; and
  ii) extract encoded information contained in the transponder signal.

2. The system of claim 1 further comprising a transponder interrogator connected to or forming part of the ECM system;
  wherein the system is further configured to transmit an interrogation signal for receipt by a transponder;
  wherein monitoring for a transponder signal from a remote transponder comprises at least monitoring for a response to the interrogation signal from a transponder.

3. The system of claim 2 comprising a single antenna shared by the ECM system and the transponder interrogator.

4. The system of claim 2 comprising a first antenna used by the ECM system, and a second antenna used by the transponder interrogator.

5. The system of claim 2, further configured to transmit, from the ECM system, an information signal in addition to the interrogation signal, the information signal including encoded information for receipt and decoding by transponders.

6. The system of claim 1 wherein:
  determining information based on the transponder signal comprises determining a range between the ECM system and the transponder based on the transponder signal.

7. The system of claim 1 wherein extracting encoded information contained in the transponder signal comprises extracting encoded information about an owner of the transponder.

8. The system of claim 1, wherein the electronic countermeasures signals are transmitted to protect against radio controlled improvised explosive devices and/or to protect against electronically-guided missile attack.

9. The system of claim 1 wherein:
  determining information based on the transponder signal comprises determining a location of the transponder owner based on one or a combination of:
  a time history of range measurements, made from a single stationary or moving ECM system;
  simultaneous or near-simultaneous measurements from multiple stationary and/or moving ECM systems.

10. The system of claim 1 further comprising:
  a remote consort communications system configured to estimate a location of the transponder based on a time difference of arrival, at the remote consort communication system, of the interrogation signal from the ECM system and the response from the transponder.

11. The system of claim 10, further configured to share at least some of the encoded information from the transponder signal, or additional information determined from the transponder signal, with one or more other remote consort communication systems of a network of multiple remote consort communication systems.

12. The system of claim 1, further comprising:
  a closed-loop control system that uses the encoded information, or additional information determined from the transponder signal, as feedback for at least one of:
  a) controlling the position of transponder owners; and
  b) resupplying transponder owners.

13. The system of claim 1 further configured to use the encoded information, or additional information determined from the transponder signal, to control agents which are not transponder owners.

14. The system of claim 1, further configured to combine information provided by the ECM system and a secondary communication system paired with transponders to produce a hierarchical tactical picture.

15. The system of claim 1, further configured to present information to an operator of the ECM system.

16. The system of claim 1 further comprising:
  the remote transponder.

17. The system of claim 16 further configured to present information to a transponder owner, from which information recommendations for actions can be distilled by the transponder owner.

18. The system of claim 1 configured to determine information based on the transponder signal and make use of the information in the ECM system by:
  determining a range of the transponder;
  adjusting at least one operational parameter of the ECM system based on the determined range.

19. The system of claim 1 wherein the encoded information comprises at least one of:
  remaining levels of consumables;
  a medical status of the transponder owner; and
  a tactical situation of the transponder owner.

20. A method comprising:
  transmitting, with an electronic counter measures (ECM) system, ECM signals for rendering a hostile electronic warfare system ineffective;
  monitoring, with the ECM system, an electromagnetic signal environment for a transponder signal that includes encoded information from a transponder of a potential protectee of the ECM system that is physically remote from the ECM system; and
  responsive to receiving a transponder signal that includes encoded information from a transponder, recovering the encoded information from the transponder signal.

21. The method of claim 20, further comprising:
  transmitting an interrogation signal from the ECM system,
  wherein monitoring the electromagnetic signal environment for a transponder signal comprises monitoring for a response to the interrogation signal from a transponder.

22. The method of claim 21 further comprising:
  estimating the location of the transponder based on a time difference of arrival, at a remote consort communication system, of the interrogation signal from the ECM system and the response from the transponder.

23. The method of claim 22, further comprising:
  sharing at least some of the encoded information from the transponder signal, or additional information derived from the encoded information, with one or more other remote consort communication systems of a network of multiple remote consort communication systems.

24. The method of claim 21, further comprising:
  transmitting, from the ECM system, an information signal in addition to the interrogation signal, the information signal including encoded information that may be received and decoded by transponders.

25. The method of claim 20, further comprising:
  determining a range between the ECM system and the transponder based on the transponder signal.

26. The method of claim 20, wherein the transponder signal includes encoded information about an owner of the transponder.

27. The method of claim 20,
  wherein the electronic countermeasures signals are transmitted to protect against radio controlled improvised explosive devices and/or to protect against electronically-guided missile attack.

28. The method of claim 20, wherein the ECM system comprises a communications system effectiveness assessment system.

29. The method of claim 20 further comprising:
determining a location of the transponder owner based on a time history of range measurements, made from a single stationary or moving ECM system, or from simultaneous or near-simultaneous measurements from multiple stationary and/or moving ECM systems.

30. The method of claim 20, further comprising:
using the encoded information, or additional information derived from the encoded information, as feedback in a closed-loop control system for controlling the position of transponder owners and/or resupplying transponder owners.

31. The method of claim 20, further comprising:
integrating information provided by the ECM and/or a secondary communications systems paired with transponders to produce a hierarchical tactical picture.

32. The method of claim 20, further comprising:
presenting information to an operator of the ECM system, from which information recommendations for actions can be distilled by the operator.

33. The method of claim 20, further comprising:
presenting information to a transponder owner, from which information recommendations for actions can be distilled by the transponder owner.

34. An electronic counter measures system configured to perform the method of claim 20.

35. A system comprising:
an ECM (electronic counter measures) system;
a transponder monitor connected to or forming part of the ECM system;
wherein the system is configured to:
monitor for a transponder signal from a remote transponder; and
determine information based on the transponder signal and make use of the information in the ECM system by:
determining a range of the transponder; and
adjusting at least one operational parameter of the ECM system based on the determined range.

* * * * *